US011867029B2

(12) United States Patent
Jones

(10) Patent No.: US 11,867,029 B2
(45) **Date of Patent: *Jan. 9, 2024**

(54) WELLBORE CLEAN-OUT TOOL

(71) Applicant: Tenax Energy Solutions, LLC, Clinton, OK (US)

(72) Inventor: Kevin Dewayne Jones, Clinton, OK (US)

(73) Assignee: Tenax Energy Solutions, LLC, Clinton, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,859

(22) Filed: Nov. 21, 2022

(65) Prior Publication Data

US 2023/0100283 A1 Mar. 30, 2023

Related U.S. Application Data

(63) Continuation of application No. 16/420,439, filed on May 23, 2019, now Pat. No. 11,506,008.

(60) Provisional application No. 62/675,806, filed on May 24, 2018.

(51) Int. Cl.

| | |
|---|---|
| ***E21B 37/00*** | (2006.01) |
| ***E21B 21/00*** | (2006.01) |
| ***E21B 23/04*** | (2006.01) |
| ***B08B 9/032*** | (2006.01) |
| *E21B 33/12* | (2006.01) |

(52) U.S. Cl.

CPC .............. *E21B 37/00* (2013.01); *B08B 9/032* (2013.01); *E21B 21/00* (2013.01); *E21B 23/04* (2013.01); *E21B 33/12* (2013.01)

(58) Field of Classification Search

CPC ................................ B08B 9/032; E21B 37/00

See application file for complete search history.

(56) References Cited

U.S. PATENT DOCUMENTS

| | | | | |
|---|---|---|---|---|
| 3,957,114 A * | 5/1976 | Streich | E21B 33/16 137/515 |
| 5,180,016 A | 1/1993 | Ross et al. | |
| 6,170,573 B1 * | 1/2001 | Brunet | E21B 47/017 166/70 |

(Continued)

FOREIGN PATENT DOCUMENTS

| | | |
|---|---|---|
| CN | 203066931 U | 7/2013 |
| CN | 105201456 A | 12/2015 |
| WO | 2004088091 A1 | 10/2004 |

OTHER PUBLICATIONS

The devices shown in FIGS. 3-26 of U.S. Patent Appl. Publication No. 2017/0247969 authored by Jones were on-sale more than one year prior to May 24, 2018.

(Continued)

*Primary Examiner* — Theodore N Yao

(74) *Attorney, Agent, or Firm* — Tomlinson Mckinstry, P.C.

(57) ABSTRACT

A tool for cleaning out the lower end of a cased wellbore having an installed production string. The tool is lowered down the production string until it projects from an end of the production string and into the wellbore. High pressure fluid is then sprayed from the tool's fluid openings into nearby portions of the wellbore. Once cleaning operations are complete, the tool is carried back to the ground surface using subterranean fluid pressure.

18 Claims, 12 Drawing Sheets

(56) References Cited

U.S. PATENT DOCUMENTS

| | | | | |
|---|---|---|---|---|
| 6,640,897 | B1 | 11/2003 | Misselbrook | |
| 11,506,008 | B2 * | 11/2022 | Jones | B08B 9/0433 |
| 2009/0126933 | A1 | 5/2009 | Telfer | |
| 2012/0298356 | A1 | 11/2012 | Sladic et al. | |
| 2015/0247372 | A1 | 9/2015 | Angeles Boza et al. | |
| 2016/0281486 | A1 | 9/2016 | Obrejanu | |
| 2017/0247969 | A1 | 8/2017 | Jones | |
| 2018/0016872 | A1 * | 1/2018 | Randle | E21B 21/12 |
| 2019/0040697 | A1 * | 2/2019 | Barker | E21B 34/10 |
| 2019/0120035 | A1 | 4/2019 | Livescu et al. | |
| 2019/0169954 | A1 | 6/2019 | Cabot et al. | |
| 2019/0360308 | A1 * | 11/2019 | Stang | E21B 34/10 |

OTHER PUBLICATIONS

Patent Cooperation Treaty "PCT International Search Report", dated Sep. 20, 2019, 3 pages, Republic of Korea.

* cited by examiner

WELLBORE CLEAN-OUT TOOL

SUMMARY

The present invention is directed to a system comprising a wellbore and a tubular production string received within the wellbore, the production string having an open lower end configured to receive subterranean fluids. The system further comprises a tool comprising an elongate body through which a longitudinal internal fluid passage extends. The body comprises an upper section through which the fluid passage extends, and a lower section that includes a plurality of external fluid openings, the openings laterally offset from, and in communication with, the internal fluid passage. The tool is partially received within the production string such that the lower section of the tool extends outside the production string and within the wellbore.

The present invention is also directed to a method of using a kit. The kit comprises a tool comprising an elongate body through which a longitudinal internal fluid passage extends. The body comprises an upper section through which the fluid passage extends, and a lower section that includes a plurality of external fluid openings, the openings laterally offset from, and in communication with, the internal fluid passage. The kit further comprises a deformable ball. The method comprises the step of sending only the tool from above ground to a stationary position within an underground production string, the production string having an open lower end configured to receive subterranean fluids.

The present invention is further directed to a method comprising the steps of incorporating a tool comprising an elongate body into a tubular production string. The production string is installed within a casing and the casing is installed within a wellbore. The production string has an open lower end configured to receive subterranean fluids. The method further comprises the step of sending the tool from above ground to a stationary position underground within the production string such that at least a portion of the body extends outside of the production and within the wellbore.

DETAILED DESCRIPTION

Figure 1:
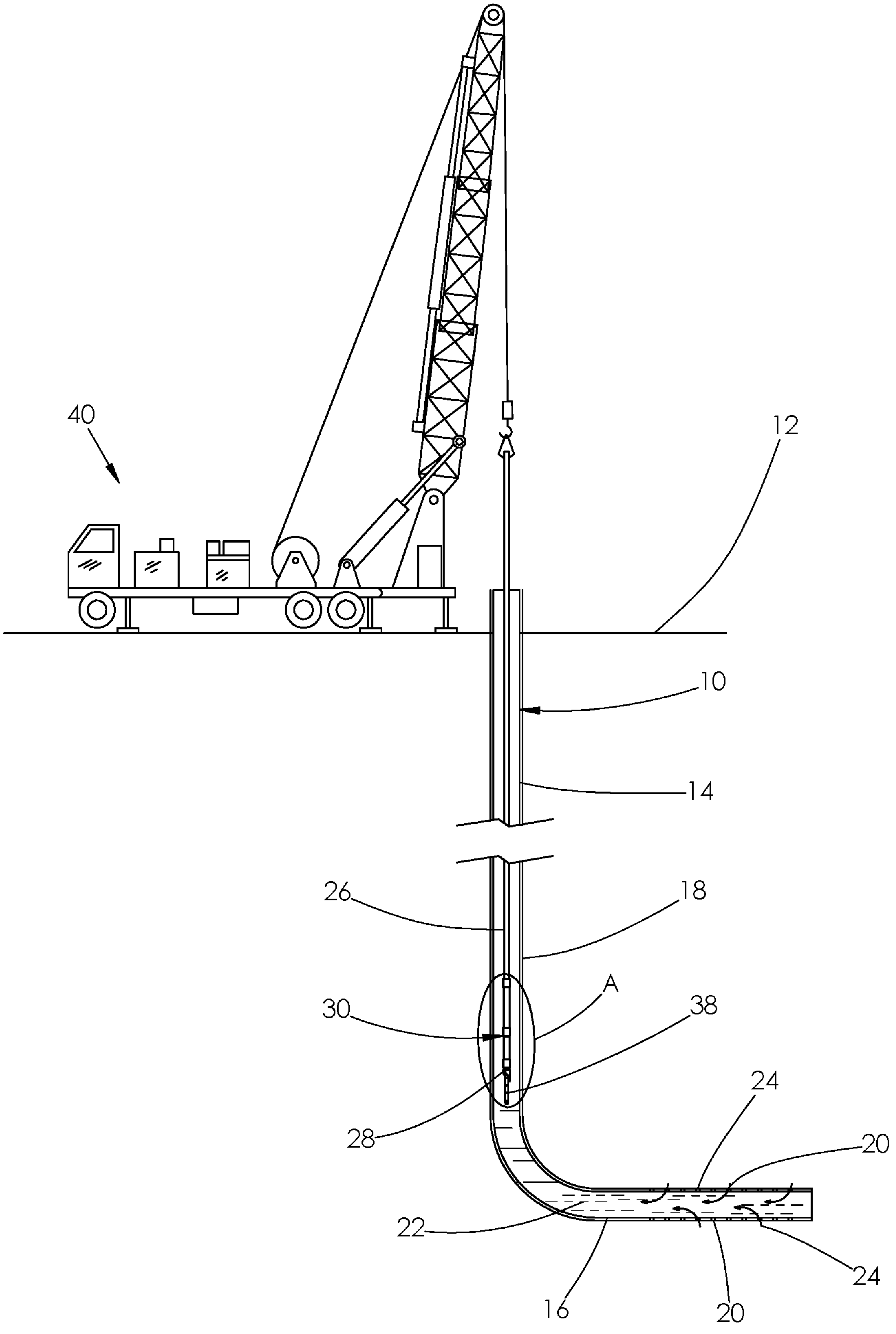
FIG. 1 is an illustration of a producing wellbore. The tool of the present invention has been installed in the production string.

Turning to FIG. 1, a producing wellbore 10 is shown formed beneath a ground surface 12. The wellbore 10 has a vertical section 14 that turns into a horizontal section 16. A casing 18 is installed throughout the length of the wellbore 10, and a plurality of perforations 20 are formed in the walls of the casing 18 along the horizontal section 16. The perforations 20 are formed during fracking operations known in the art. Subterranean fluid 22 contained in the subsurface surrounding the wellbore 10 flows into the casing 18 through the perforations 20, as shown by arrows 24. The subterranean fluid may be crude oil, natural gas, or a mixture of both.

The pressure applied to the subterranean fluid entering the casing 18 may not be high enough to force the fluid to flow to the ground surface 12. In such case, a tubular production string 26 may be installed within the casing 18. The production string 26 draws fluid trapped within the casing 18 to the ground surface 12.

As shown in FIG. 1, the production string 26 has a smaller internal diameter than the casing 18. The smaller internal diameter facilitates the movement of the fluid through the production string 26 to the ground surface 12. A pump (not shown) may also be installed within the production string 26 to help move to the fluid to the ground surface 12.

Figure 2:
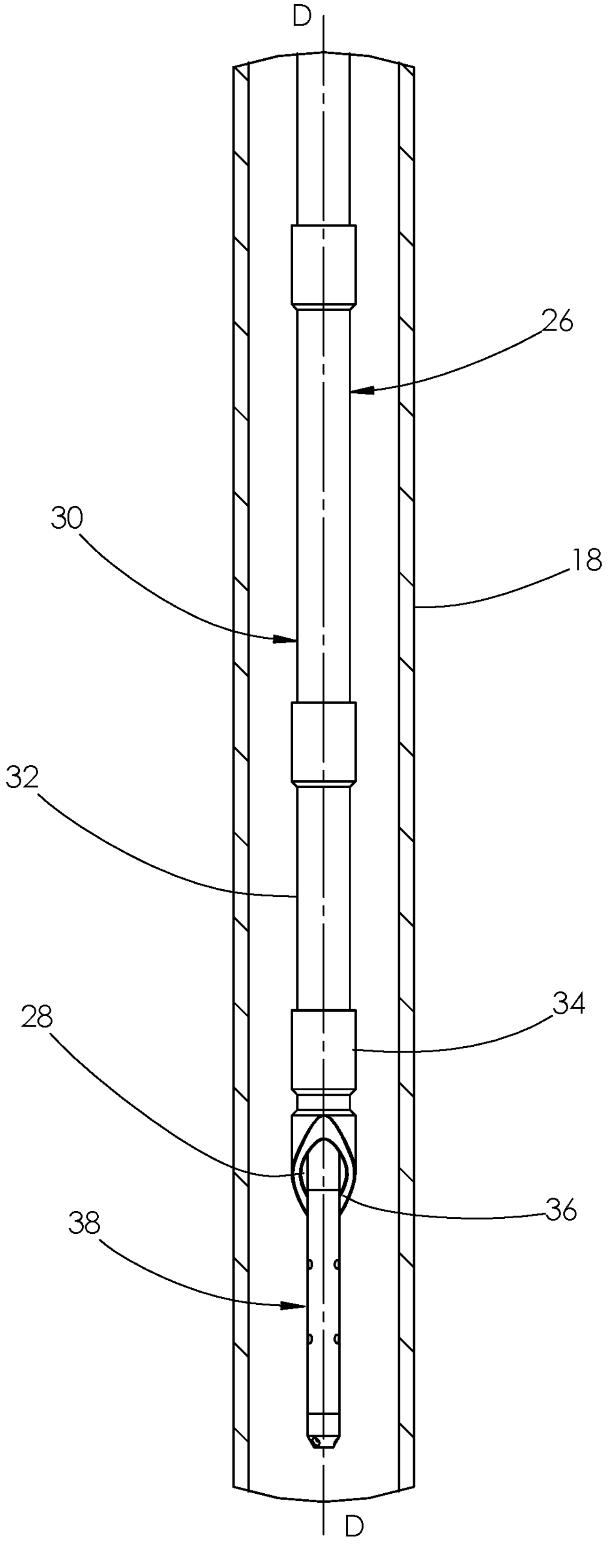
FIG. 2 is an enlarged view of area A shown in FIG. 1, including the installed tool.
Figure 7:
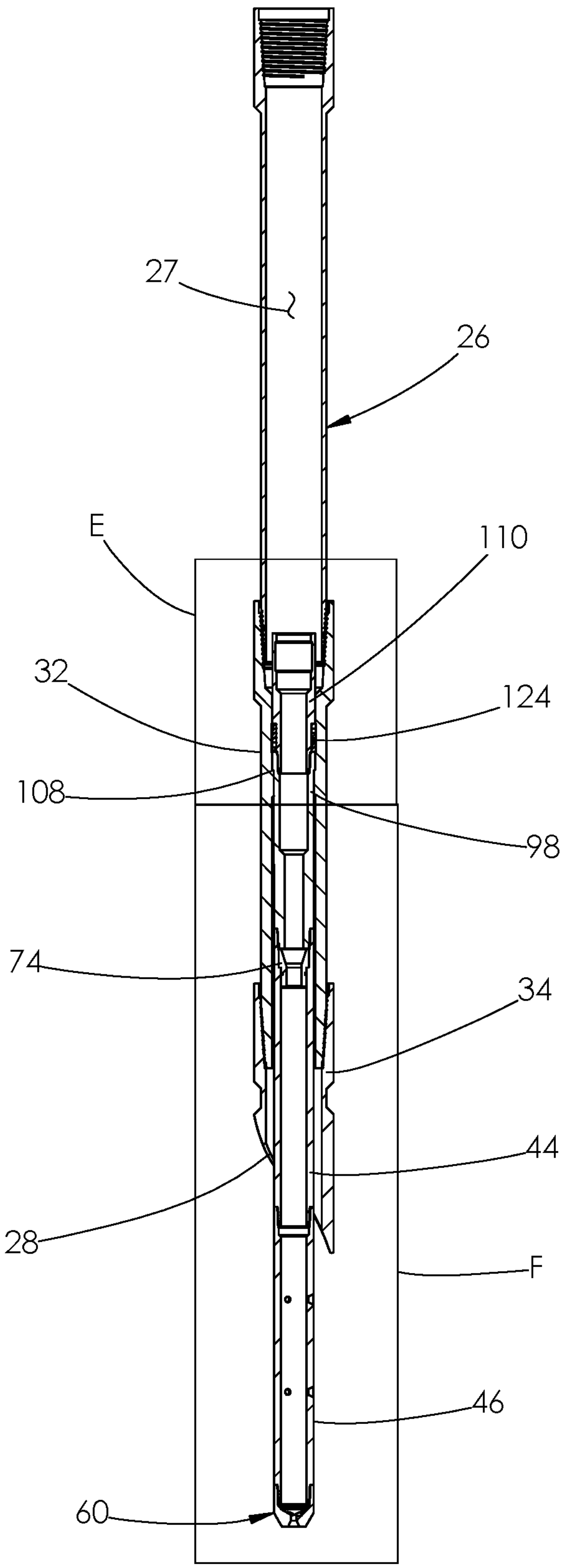
FIG. 7 is a cross-sectional view of the tool and production string shown in FIG. 2. The tool and partial production string are sectioned by a plane that extends through the axis D-D shown in FIG. 2.

With reference to FIGS. 1 and 2, the production string 26 has a longitudinal internal fluid passage 27, shown in FIG. 7, that extends throughout the string 26 and opens at an opening 28. The opening 28 is formed in a lower end 30 of the string 26. The opening 28 is exposed to the interior of the casing 18. Fluid contained within the casing 18 may enter the production string 26 through the opening 28.

Continuing with FIG. 2, the lower end 30 of the production string 26 comprises a landing sub 32 attached to a mule shoe 34. The landing sub 32 and mule shoe 34 may be attached to the production string 26 before it is installed within the casing 18. The mule shoe 34 has an angled front face 36. The opening 28 of the production string 26 is formed within the front face 36 of the mule shoe 34. In alternative embodiments, the mule shoe may be removed, and the opening of the production string may be the open end of the landing sub.

Continuing with FIGS. 1 and 2, flow-restricting substances, such as sand, scale, wax or other well debris may build-up near the opening 28 of the production string 26. The build-up of such substances may restrict the flow of fluid into the production string 26. The present disclosure is directed to a tool 38 that functions to clean any build-up or debris from the opening 28 of the production string 26.

As will be described in more detail herein, the tool 38 may be lowered from the ground surface 12 to a stationary position within the production string 26. In the stationary position, the tool 38 engages the inner walls of the landing sub 32 and projects from the opening 28 into the casing 18.

In operation, fluid is delivered from the ground surface 12 to the tool 38. The tool 38 is configured to spray high pressure fluid into nearby portions of the wellbore. The high pressure fluid clears unwanted debris and flow-restricting substances from around the opening 28 of the production string 26.

Continuing with FIG. 1, the production string 26 may be installed by a workover rig 40 positioned at the ground surface 12. The rig 40 lowers the string 26 down the casing 18 until it reaches the desired depth. After the production string 26 is installed, a pump (not shown) may be installed within the string 26 to help pump fluid to the ground surface 12. The pump may be attached to an above-ground rod lift by a series of rods disposed within the string. Cyclic movement of the rod lift powers the pump and draws fluid into the production string and to the ground surface.

The tool 38 is shown used with the workover rig 40 in FIG. 1. However, the tool 38 may also be used after the above described pump has been installed within the string. The pump and attached rods are removed before the tool 38 is delivered to its stationary position. The pump and rods are reinstalled after the tool 38 cleans build-up and debris from the wellbore and is removed from the string.

Figure 3:
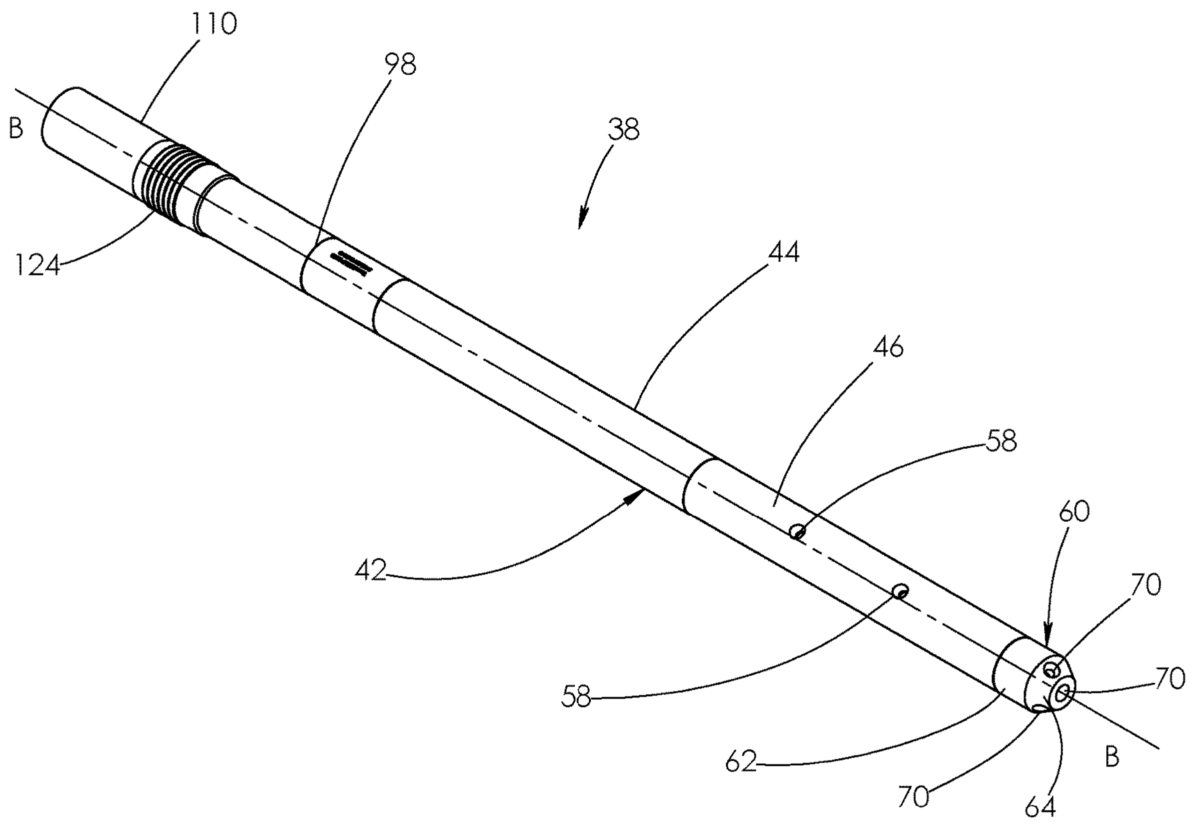
FIG. 3 is a perspective view of the tool shown in FIG. 2.
Figure 4:
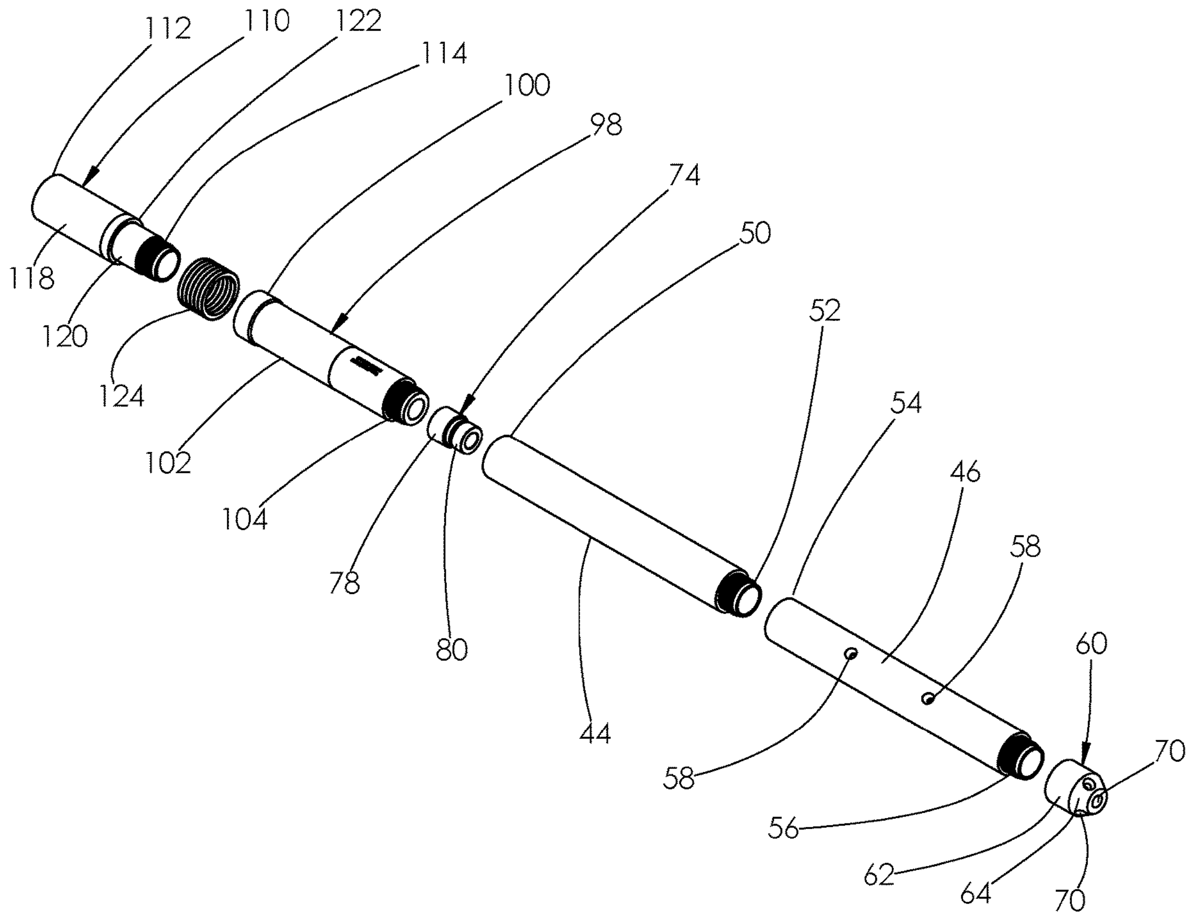
FIG. 4 is an exploded view of components of the tool shown in FIG. 3.
Figure 5:
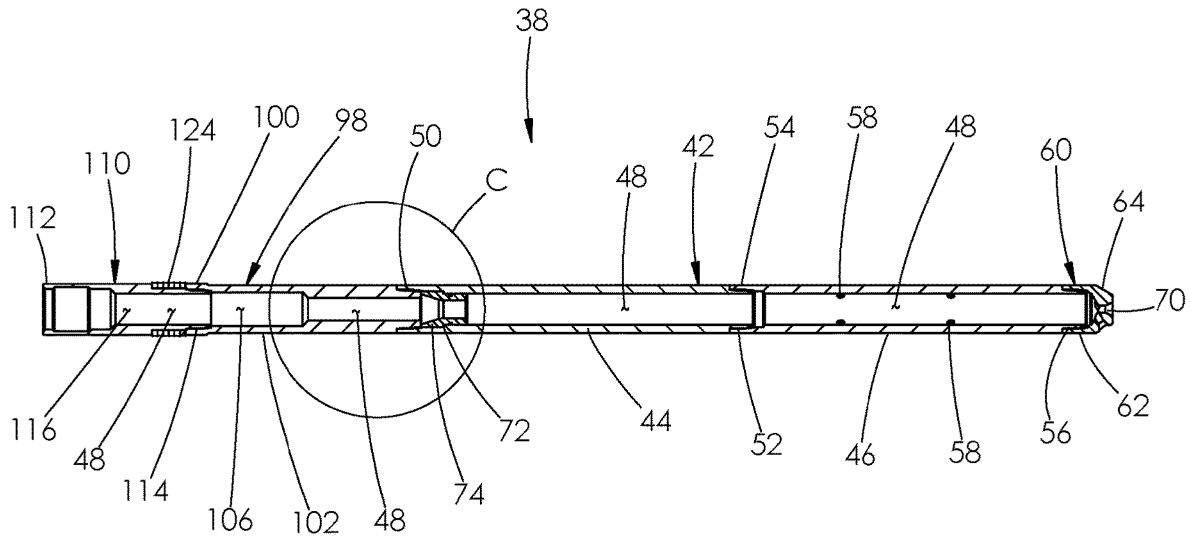
FIG. 5 is a cross-sectional view of the tool shown in FIG. 3. The tool is sectioned by a plane that extends through the axis B-B shown in FIG. 3.

Turning to FIG. 3-5, the tool 38 comprises an elongate body 42 having an upper section 44 joined to a lower section 46. Each section 44 and 46 has the same maximum cross-sectional diameter. In alternative embodiments, the maximum cross-sectional diameter of the upper and lower sections may be different. A longitudinal internal fluid passage 48 extends through both sections 44 and 46, as shown in FIG. 5.

The upper and lower sections 44 and 46 shown in the figures are separate pieces threaded together. The upper section 44 has an internally threaded first end 50 and an opposed externally threaded second end 52, as shown in FIG. 4. Likewise, the lower section 46 has an internally threaded first end 54 and an opposed externally threaded second end 56, as shown in FIG. 4. The external threads formed on the second end 52 of the upper section 44 mate with the internal threads formed on the first end 54 of the lower section 46, as shown in FIG. 5. In alternative embodiments, the upper and lower sections may be a single piece.

A plurality of external fluid openings 58 are formed in the lower section 46 of the body 42. The openings 58 are laterally offset from and in communication with the internal fluid passage 48, as shown in FIG. 5. Fluid flowing through the fluid passage 48 may exit the body 42 through the fluid openings 58.

Continuing with FIGS. 3-5, a plug 60 is attached to the lower section 46 opposite the upper section 44. The plug 60 has a first section 62 joined to a tapered nose 64. The first section 62 has the same maximum cross-sectional dimension as the lower section 46. In alternative embodiments, the maximum cross-sectional diameter of the first section may be different from the maximum cross-sectional diameter of the lower section. Internal threads are formed in the first section 62 of the plug 60 that mate with external threads formed on the second end 56 of the lower section 46, as shown in FIGS. 4 and 5.

At least one fluid port 70 is formed in the tapered nose 64 of the plug 60. In the embodiment of the plug 60 shown in the figures, a plurality of fluid ports 70 are formed in the tapered nose 64. The fluid ports 70 are laterally offset from and in communication with the fluid passage 48. Fluid flowing through the fluid passage 48 may exit through the fluid ports 70, in addition to the fluid openings 58.

Figure 6:
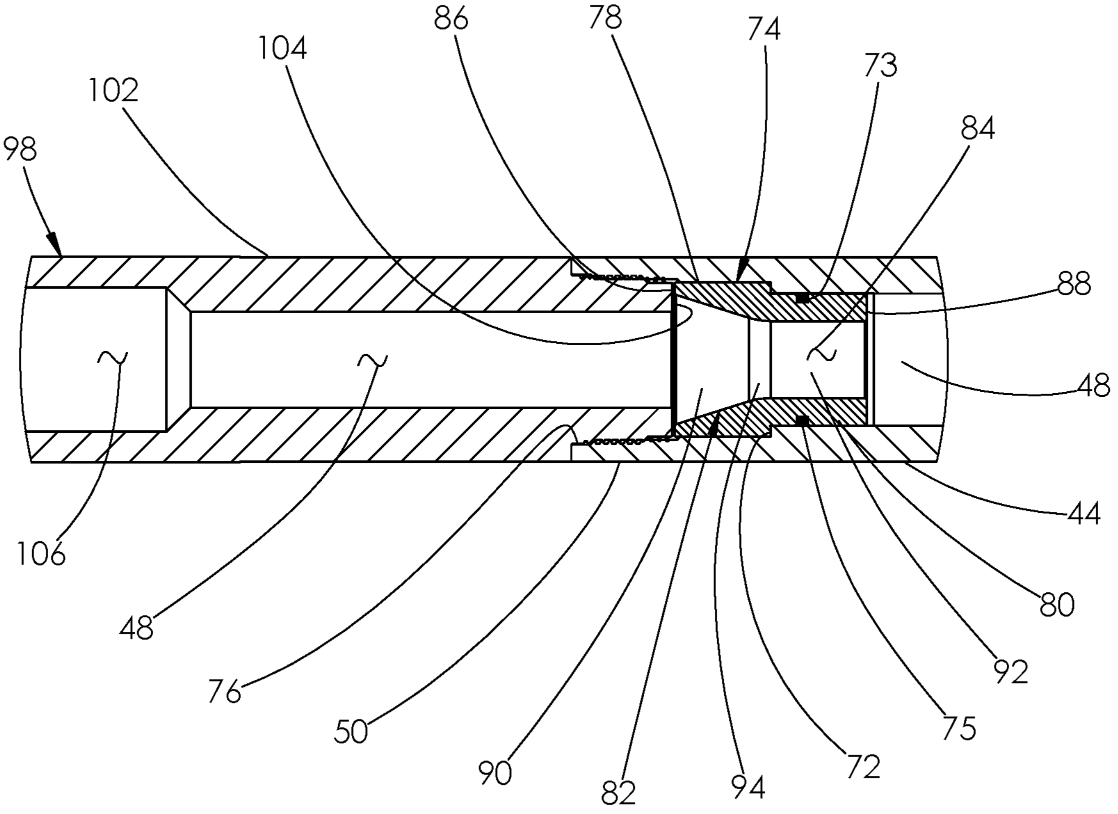
FIG. 6 is an enlarged view of area C shown in FIG. 5.

With reference to FIGS. 5 and 6, an annular shoulder 72 is formed in the inner walls of the upper section 44 proximate its first end 50. The shoulder 72 is axially spaced from the internal threads formed in the first end 50 and surrounds the fluid passage 48. A funnel sub 74 is installed within the upper section 44 through an opening 76 at the first end 50.

The funnel sub 74 has a top flange 78 joined to a bottom section 80, as shown in FIGS. 4 and 6. The top flange 78 has a larger maximum cross-sectional dimension than the bottom section 80. When the funnel sub 74 is installed within the upper section 44, the top flange 78 engages the annular shoulder 72 and the bottom section 80 extends into the fluid passage 48. Engagement of the annular shoulder 72 with the top flange 78 prevents the funnel sub 74 from axial movement within the upper section 44 towards the lower section 46. In alternative embodiments, top flange and the bottom section may have the same maximum cross-sectional diameter. In such case, the bottom section may engage the annular shoulder formed in the upper section.

An annular groove 73 is formed in the outer surface of the bottom section 80. The groove 73 houses a fluid seal 75. The seal 75 prevents fluid from leaking around the funnel sub 74 when the sub is installed within the upper section 44. The seal 75 may be an O-ring.

Figure 10:
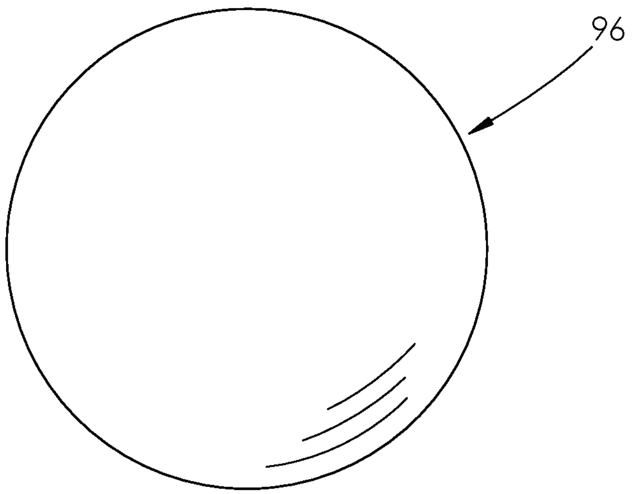
FIG. 10 is a perspective view of a deformable ball in an undeformed state.
Figure 11:
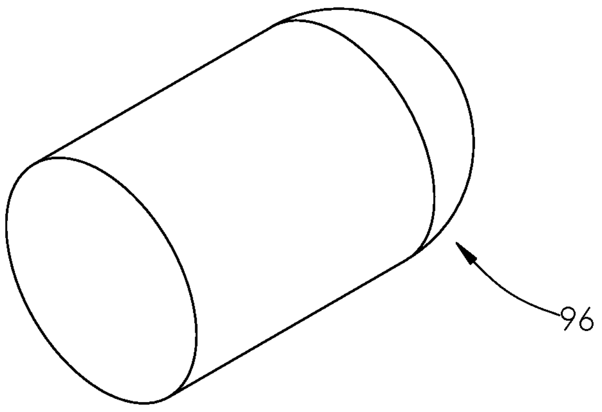
FIG. 11 is a perspective view of the deformable ball from FIG. 10 in a deformed state.

Continuing with FIG. 6, a funnel element 82 is formed inside of the funnel sub 74. The funnel element 82 has a fluid passage 84 that opens at a first surface 86 and an opposite second surface 88 of the funnel sub 74. The second surface 88 may also be referred to as the discharge end of the funnel sub 74. The fluid passage 84 is in communication with the fluid passage 48. The first surface 86 opens into an enlarged bowl 90. The bowl 90 tapers inwardly and connects with a narrow neck 92 that opens at the second surface 88. The connection between the bowl 90 and the narrow neck 92 forms a seat 94. The bowl 90 is formed within the top flange 78 and the narrow neck 92 is formed within the bottom section 80 of the funnel sub 74. As will be described in more detail herein, the funnel sub 74, in combination with a deformable ball 96, shown in FIGS. 10 and 11, function as a valve within the tool 38.

With reference to FIGS. 3-5, 7, and 8, a mating sub 98 is attached to the first end 50 of the upper section 44. The mating sub 98 has a top flange 100 joined to an elongate bottom section 102. The top flange 100 has a larger maximum cross-sectional dimension than the bottom section 102. The bottom section 102 has the same maximum cross-sectional dimension as the upper section 44.

Internal threads are formed within the top flange 100 and external threads are formed in the bottom section 102 adjacent a bottom surface 104 of the mating sub 98. The external threads formed on the bottom section 102 mate with the internal threads formed in the first end 50 of the upper section 44. When mated, the bottom surface 104 of the mating sub 98 abuts the first surface 86 of the funnel sub 74, as shown in FIG. 6. The mating sub 98 holds the funnel sub 74 against axial movement within the upper section 44. A fluid passage 106 extends through the mating sub 98 that communicates with the fluid passage 84 formed in the funnel element 82. When the mating sub 98 is attached to the upper section 44, the sub 98 forms a segment of the body 42 and the fluid passage 106 forms a segment of the fluid passage 48.

Figure 8:
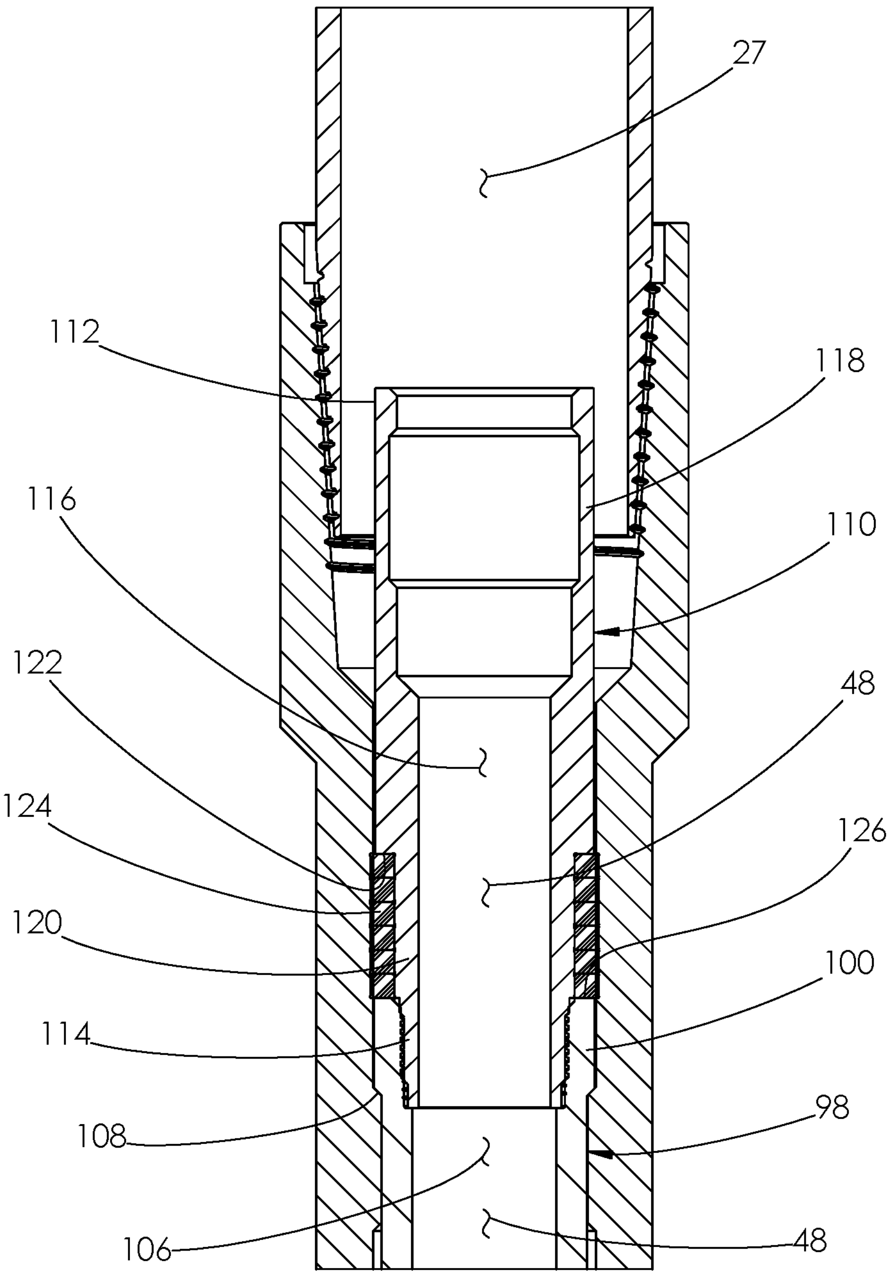
FIG. 8 is an enlarged view of area E shown in FIG. 7.
Figure 9:
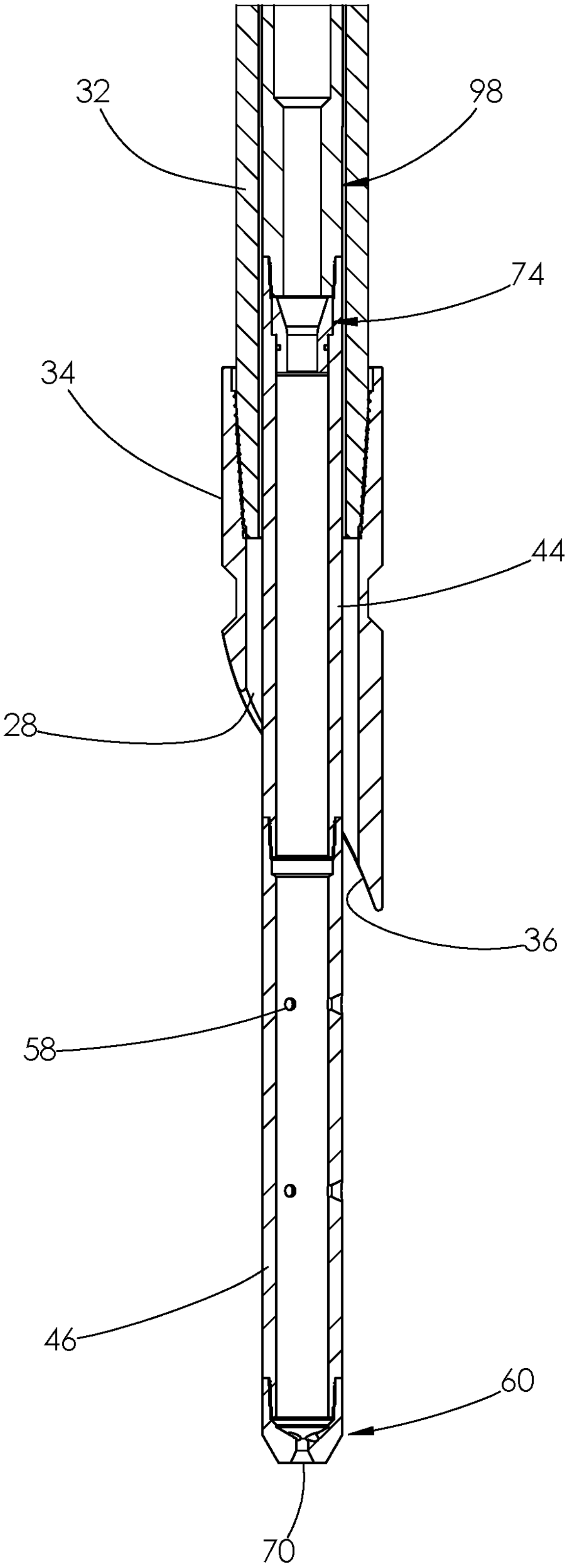
FIG. 9 is an enlarged view of area F shown in FIG. 7.

Continuing with FIGS. 7 and 8, an annular shoulder 108 is formed in the walls of the landing sub 32. The annular shoulder 108 surrounds the fluid passage 27 in the production string 26. When the tool 38 is lowered to a stationary position within the production string 26, the top flange 100 of the mating sub 98 engages the annular shoulder 108 of the landing sub 32. Such engagement prevents further axial movement of the tool 38 down the production string 26. The tool 38 is sized so that the lower section 46 and the plug 60 project from the opening 28 formed in the mule shoe 34 when the tool is in the stationary position, as shown in FIGS. 7 and 9. In alternative embodiments, the bottom section may have a larger maximum cross-sectional diameter than the top flange. In such case, the bottom section may engage with the annular shoulder formed in the landing sub.

With reference to FIGS. 3-5, 7, and 8, a pump-down sub 110 is attached to the top flange 100 of the mating sub 98. The pump-down sub no has an open first end 112 and an externally threaded second end 114. The external threads on the second end 114 mate with the internal threads formed in the top flange 100 of the mating sub 98, as shown in FIGS. 5 and 8. A fluid passage 116 extends through the pump-down sub 110 and communicates with the fluid passage 106 formed in the mating sub 98. When both the pump-down sub no and the mating sub 98 are attached to the body 42, the pump-down sub no forms a segment of the body 42 and the fluid passage 116 forms a segment of the fluid passage 48.

With reference to FIGS. 4 and 8, the pump-down sub 110 has an upper portion 118 joined to a lower portion 120. The upper portion 118 has a larger maximum cross-sectional diameter than the lower portion 120 such that an annular shoulder 122 is formed between the upper and lower portions 118 and 120. A plurality of seals 124 are disposed around the outer surface of the lower portion 120. The seals 124 are each elastic packing seals. In alternative embodiments, the seals may each be O-rings or other seals known in the art. When the pump-down sub 110 is attached to the mating sub 98, the seals 124 are held against axial movement by the annular shoulder 122 and a top surface 126 of the mating sub 98, as shown in FIG. 8.

Continuing with FIGS. 7 and 8, when the tool 38 is in the stationary position within the production string 26, the seals 124 engage the inner walls of the landing sub 32. The seals 124 prevent fluid delivered from the ground surface 12 from leaking between the tool 38 and the production string 26. Thus, any fluid delivered from the ground surface 12 to the tool 38 is directed into the fluid passage 48.

The tool 38 and its components may be made of steel. In alternative embodiments, the tool 38 may be made of aluminum, plastic, carbon fiber or other materials suitable for oil and gas operations.

In operation, the tool 38 is lowered to the stationary position within the production string 26, as shown in FIG. 7. The tool 38 may be carried by fluid to the stationary position. Once in the stationary position, high pressure fluid is delivered to the tool 38. The fluid enters the pump-down tool 110 and continues through the fluid passage 48 until the fluid is exposed to the fluid openings 58 and ports 70. Fluid sprays from the openings 58 and ports 70 and clears debris away from the lower end 30 of the production string 26.

Figure 12:
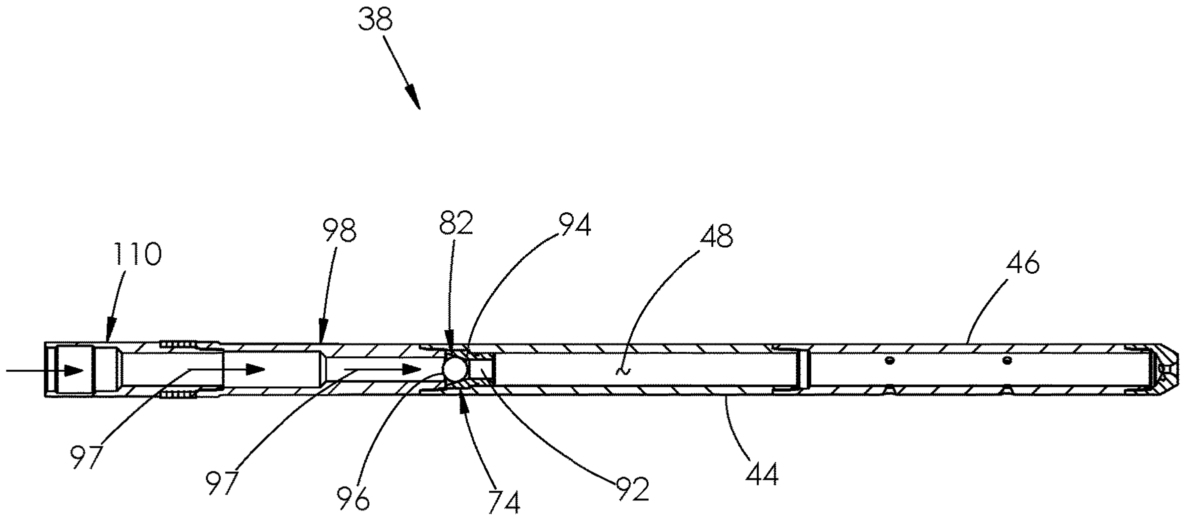
FIG. 12 shows the tool of FIG. 5 with a deformable ball seated in the tool's funnel sub.
Figure 13:
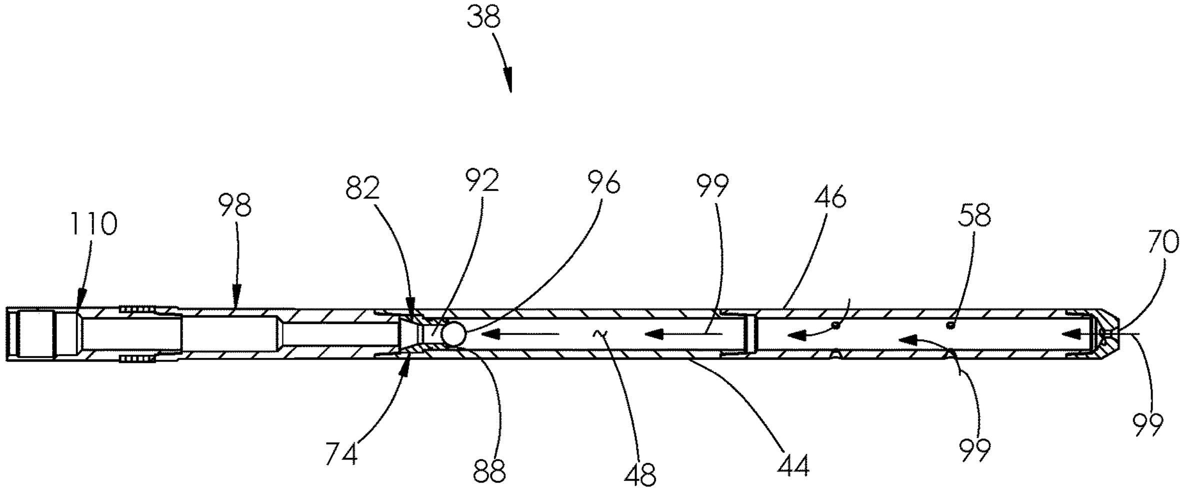
FIG. 13 shows the same tool as FIG. 12. The ball has been extruded through the funnel and captured within a zone that includes the discharge end of the funnel neck.

With reference to FIGS. 10-13, once it is believed that tool 38 has sufficiently cleaned debris from around the opening 28 of the string 26, a deformable ball 96 may be lowered down to the string 26 to the tool 38. The ball 96 is configured to transform between an undeformed state, shown in FIG. 10, and a deformed state, shown in FIG. 11. In the undeformed state, the ball 96 has a maximum cross-sectional dimension that exceeds the internal maximum cross-sectional dimension of the narrow neck 92 of the funnel element 82, as shown in FIGS. 12 and 13. In the deformed state, the ball 96 has a maximum cross-sectional dimension that is less than the internal maximum cross-sectional dimension of the funnel neck 92.

The ball 96 is preferably made of nylon. In alternative embodiments, the ball may be made of any material that is capable of deforming under hydraulic pressure and withstanding high temperatures.

In operation, the ball 96, in an undeformed state, is carried down the string 26 by fluid until the ball 96 reaches the funnel sub 74. The ball 96 will engage the seat 94 formed in the funnel element 82 and block fluid, shown by arrows 97, from flowing through the funnel element 82. Fluid pressure above the ball 96 is increased until the ball 96 is deformed and forced through the narrow neck 92 of the funnel element 82. Preferably, the ball 96 will maintain an undeformed state until the fluid pressure applied to the ball 96 exceeds 2,000 psi.

The fluid will flow through the funnel element 82 immediately after the ball 96 is extruded through the narrow neck 92. The fluid will flow along the fluid passage 48 and into the lower section 46 of the tool 38. From there, the fluid will exit the tool 38, thereby decreasing the fluid pressure applied to the ball 96. The ball 96, however, will remain trapped within the fluid passage 48. The lower section 46 and the plug 60 function as a cage to confine the ball 96 within the tool 38. As the fluid pressure applied to the ball 96 decreases, the ball 96 will expand back to its undeformed state.

With reference to FIG. 13, after the ball 96 has been extruded through the funnel element 82, fluid is no longer delivered from the ground surface 12 to the tool 38. Subterranean fluid may flow into the tool 38 through the openings 58 and the fluid ports 70, as shown by arrows 99. The seals 124 prevent any subterranean fluid from flowing around the tool and into the production string 26. Subterranean fluid entering the tool 38 will hold the ball 96 against the second surface 88 of the funnel element 82. Fluid pressure will build below the ball 96 and eventually move the tool 38 axially within the string 26.

Turning back to FIG. 7, axial movement of the tool 38 towards the ground surface 12 disengages the mating sub 98 from the landing sub 32. Once the mating sub 98 and landing sub 32 are disengaged, the tool 38 may be carried up the string 26 by the subterranean fluid to the ground surface 12. At the ground surface 12, the tool 38 may be separated from the subterranean fluid and removed from the production string 26. Once the tool 38 is removed from the string 26, the tool may be disassembled and the ball 96 removed.

If it is determined that the lower end 30 of the production string 26 needs to be cleaned again, the same tool 38 may again be lowered to a stationary position within the string 26. The operation described above may then be performed a second time. The tool 38 may be installed within and removed from the production string 26 as many times as desired.

The tool 38 may also be used to identify unknown debris trapped within the production string 26. The tool 38 may become stuck on unknown debris as it is lowered to the stationary position. If the tool 38 does not reach the stationary position, an operator will likely notice a change in the pressure differential within the wellbore 10 as fluid is delivered to the tool 38. The operator may pump fluid down the string 26 and attempt to remove the debris using the tool 38. If this technique is unsuccessful, the operator may fish the tool 38 out of the string 26 and utilize more invasive procedures to remove the debris.

One or more kits may be useful with the present disclosure. The kit may comprise the upper and lower section 44 and 46 and at least one deformable ball 96.

The kit may further comprise the plug 60, funnel sub 74, mating sub 98, and pump-down tool 110.

Changes may be made in the construction, operation and arrangement of the various parts, elements, steps and procedures described herein without departing from the spirit and scope of the invention as described in the following claims.

The invention claimed is:

1. A system, comprising:

a wellbore formed below ground and configured to produce subterranean fluid comprising crude oil, natural gas, or a mixture of both;

a casing installed within the wellbore;

a production string installed within the casing, the production string having an open lower end configured to receive the subterranean fluid;

a tool, comprising:

an elongate body having a longitudinal internal fluid passage extending therethrough, the elongate body comprising:

an upper section joined to a lower section, the lower section having a plurality of external fluid openings formed therein, each external fluid opening in communication with the internal fluid passage; and a seat positioned within the upper section of the tool, the seat having an upstream surface and an opposed downstream surface joined by the internal fluid passage;

fluid contained within the upper section of the tool; and a ball engaging the upstream surface of the seat and blocking the fluid from passing into the lower section of the tool; and in which the tool is positioned within the production string such that at least a portion of the lower section of the tool projects from the open lower end of the production string and is exposed to the casing.

2. The system of claim 1, in which the upper section and lower section of the elongate body are separate pieces.

3. The system of claim 1, the tool further comprising:

a plug situated at a base of the lower section of the elongate body and having at least one fluid port formed therein.

4. The system of claim 1, the tool further comprising:

a sub attached to the upper section of the body; in which a maximum cross-sectional dimension of the sub is larger than a maximum cross-sectional dimension of the upper and lower sections of the elongate body.

5. The system of claim 1, in which the tool further comprises:

a plurality of seals disposed around an outer surface of the upper section and engaging an inner surface of the production string.

6. The system of claim 1, in which the tool further comprises:

a mating sub attached to the upper section and having a flange formed around an outer surface of the mating sub, the flange engaging an annular shoulder formed in the production string.

7. The system of claim 6, in which the tool further comprises:

a funnel sub installed within the upper section and engaging a lower surface of the mating sub, the funnel sub having the seat formed therein.

8. The system of claim 7, in which the tool further comprises:

a pump-down sub attached to the mating sub; and a plurality of seals disposed around an outer surface of the pump-down sub and engaging an inner surface of the production string.

9. The system of claim 7, in which the seat comprises an enlarged and recessed bowl connected to a narrow neck; and in which the bowl comprises an upstream surface of the seat and a lower surface of the narrow neck comprises a downstream surface of the seat.

10. The system of claim 1, in which the seat comprises an enlarged and recessed bowl connected to a narrow neck; and in which the bowl comprises the upstream surface of the seat and a lower surface of the narrow neck comprises the downstream surface of the seat.

11. The system of claim 3, in which the ball is deformable, the ball having an undeformed shape with a maximum cross-sectional dimension that exceeds the maximum internal cross-sectional dimension of the narrow neck, and the ball having a deformed shape with a maximum cross-sectional dimension that is less than or equal to the maximum internal cross-sectional dimension of the narrow neck.

12. The system of claim 10, in which the seat is formed within a funnel sub, the funnel sub being a separate piece from the upper section and installed within the upper section.

13. A system, comprising:

a wellbore formed below ground and configured to produce subterranean fluid comprising crude oil, natural gas, or a mixture of both;

a casing installed within the wellbore;

a production string installed within the casing, the production string having an open lower end configured to receive the subterranean fluid;

a tool, comprising:

an elongate body having a longitudinal internal fluid passage extending therethrough, the elongate body comprising:

an upper section joined to a lower section, the lower section having a plurality of external fluid openings formed therein, each external fluid opening in communication with the internal fluid passage; and a seat positioned within the upper section of the tool, the seat having an upstream surface and an opposed downstream surface joined by the internal fluid passage;

the subterranean fluid positioned within the lower section of the tool; and a ball engaging the downstream surface of the seat and blocking the subterranean fluid from flowing upstream into the production string; and in which the tool is positioned within the production string such that at least a portion of the lower section of the tool projects from the open lower end of the production string and is exposed to the casing.

14. The system of claim 13, in which the seat comprises an enlarged and recessed bowl connected to a narrow neck; and in which the bowl comprises the upstream surface of the seat and a lower surface of the narrow neck comprises the downstream surface of the seat.

15. The system of claim 14, in which the seat is formed within a funnel sub, the funnel sub being a separate piece from the upper section and installed within the upper section.

16. The system of claim 13, in which the upper section and lower section of the elongate body are separate pieces.

17. The system of claim 13, the tool further comprising:

a plug situated at a base of the lower section of the elongate body and having at least one fluid port formed therein.

18. The system of claim 13, the tool further comprising:

a sub attached to the upper section of the body; in which a maximum cross-sectional dimension of the sub is larger than a maximum cross-sectional dimension of the upper and lower sections of the elongate body.

* * * * *